(12) United States Patent
Bangalore et al.

(10) Patent No.: US 7,890,324 B2
(45) Date of Patent: Feb. 15, 2011

(54) CONTEXT-SENSITIVE INTERFACE WIDGETS FOR MULTI-MODAL DIALOG SYSTEMS

(75) Inventors: Srinivas Bangalore, Morristown, NJ (US); Michael Johnston, Hoboken, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 1176 days.

(21) Appl. No.: 10/325,292

(22) Filed: Dec. 19, 2002

(65) Prior Publication Data

US 2004/0122674 A1   Jun. 24, 2004

(51) Int. Cl.
    *G10L 15/00*   (2006.01)
(52) U.S. Cl. ............... 704/231; 704/1; 704/9; 704/251; 704/257; 704/275; 715/256; 345/619; 345/629; 709/228
(58) Field of Classification Search .......... 704/9, 704/1, 231, 251, 257, 275; 707/2–5; 715/715, 715/256; 345/619, 629; 709/228
See application file for complete search history.

(56) References Cited

U.S. PATENT DOCUMENTS

| | | | |
|---|---|---|---|
| 5,689,717 A * | 11/1997 | Pritt ............................ 715/234 |
| 5,999,948 A * | 12/1999 | Nelson et al. ............... 715/506 |
| 6,237,004 B1 * | 5/2001 | Dodson et al. ............... 707/102 |
| 6,321,158 B1 | 11/2001 | DeLorme et al. |
| 6,333,753 B1 * | 12/2001 | Hinckley ..................... 715/768 |
| 6,640,185 B2 | 10/2003 | Yokota et al. |
| 7,030,890 B1 * | 4/2006 | Jouet et al. .................. 345/619 |
| 7,036,128 B1 * | 4/2006 | Julia et al. ................... 719/317 |
| 7,243,364 B2 * | 7/2007 | Dunn et al. ................... 725/93 |
| 7,263,657 B2 * | 8/2007 | Soin et al. .................... 715/248 |
| 2002/0044152 A1 * | 4/2002 | Abbott et al. ............... 345/629 |
| 2003/0013483 A1 | 1/2003 | Ausems et al. |
| 2003/0018427 A1 * | 1/2003 | Yokota et al. ............... 701/208 |
| 2003/0046401 A1 * | 3/2003 | Abbott et al. ............... 709/228 |
| 2003/0101044 A1 * | 5/2003 | Krasnov ......................... 704/4 |
| 2003/0122870 A1 * | 7/2003 | Aggarwal et al. ........... 345/760 |
| 2003/0164859 A1 * | 9/2003 | Evans .......................... 345/792 |
| 2004/0021695 A1 * | 2/2004 | Sauermann et al. ......... 345/786 |
| 2004/0086095 A1 * | 5/2004 | Dixit et al. ............... 379/88.17 |
| 2005/0182558 A1 | 8/2005 | Maruta |
| 2006/0111909 A1 * | 5/2006 | Maes et al. .................. 704/270 |

* cited by examiner

*Primary Examiner*—David R Hudspeth
*Assistant Examiner*—Lamont M Spooner

(57) ABSTRACT

A system and method of presenting widgets to a user during a multi-modal interactive dialog between a user and a computer is presented. The system controls the multi-modal dialog; and when user input would help to clarify or speed up the presentation of requested information, the system presents a temporary widget to the user to elicit the user input in this regard. The system presents the widget on a display screen at a position that will not interfere with the dialog. Various types of widgets are available, such as button widgets, sliders and confirmation widgets, depending on the type of information that the system requires.

20 Claims, 8 Drawing Sheets

CONTEXT-SENSITIVE INTERFACE WIDGETS FOR MULTI-MODAL DIALOG SYSTEMS

RELATED CASES

The present application relates to U.S. patent application Ser. No. 10/216,390, filed Aug. 12, 2002, now U.S. Pat. No. 7,505,908, issued Mar. 17, 2009, U.S. patent application Ser. No. 10/216,448, filed Aug. 12, 2002, now abandoned, and U.S. patent application Ser. No. 10/216,392, filed Aug. 12, 2002, now abandoned, each of which is assigned to the assignee of the present invention. The present application further relates to U.S. patent application Ser. No. 10/325,296, filed Dec. 19, 2002, now U.S. Pat. No. 7,177,815, issued Feb. 13, 2007, U.S. patent application Ser. No. 10/326,629, filed Dec. 19, 2002, now U.S. Pat. No. 7,177,816, issued Feb. 13, 2007 and U.S. patent application Ser. No. 10/326,689, filed Dec. 19, 2002, now abandoned, each of which is assigned to the assignee of the present invention and filed on the same day as the present application. The content of each of these applications is incorporated herein by reference.

BACKGROUND OF THE INVENTION

1. Field of the Invention

The present invention relates to multi-modal computer interfaces and more specifically to a system and method of using graphical widgets to increase the efficiency of multi-modal computer interaction.

2. Discussion of Related Art

The availability of multi-modal interfaces is expanding as speech recognition technology, gesture recognition technology and computing power increases. For example, known speech recognition technology enables a user to provide some basic instructions such as "call mom" to a computer device, such as a telephone system. In this manner, the telephone system retrieves the telephone number for "mom" and dials the number, thus enabling the user to drive and dial a phone number without the distraction of pressing the touch-tone telephone buttons. Such systems are "multi-modal" because the user can interact with the device in more than one manner, such as via touch-tone buttons or speaking.

Similarly, graphical user interfaces ("GUIs") are also well known in the art. Interfaces such as the Microsoft® Windows system, the Macintosh® operating system, and handheld systems such as Palm Pilot's® operating system provide users with a graphical interface including menus providing selectable options to navigate and achieve tasks. For example, the well-known Microsoft "Start" option in the GUI pops up a menu with user-selectable options like "Programs" or "Settings." These menus enable the user to navigate and control the computer and complete tasks.

Other computer devices provide graphical user interfaces for users to provide and receive information in an efficient manner. Some attempts have been made to combine speech recognition technology with graphical user interfaces. One example is the Multi-Modal Voice Post Query (MVPQ) Kiosk, discussed in S. Narayanan, G. Di Fabbrizio, C. Kamm, J. Hubbell, B. Buntschuh, P. Ruscitti, J. Wright, "Effects of Dialog Initiative and Multi-Modal Presentation Strategies on Large Directory Information Access," *ICSLP*, pp. 636, 639, Beijing, China, 2000 ("Kamm et al."), incorporated herein. The MVPQ kiosk allows users to select among a number of different options when they request information about a particular person in a telephone and address directory software application. FIG. 1(a) illustrates an example opening GUI 10 for a MVPQ Kiosk. This GUI enables the user to either type in a name in the field 12 or say the name that the person wishes to look up.

For example, if the user asks for "Kowalski," the system presents either the name and information for the person named Kowalski or, if there is more than one, the different Kowalski's in a list on the display screen 10 and the user can use touch input or mouse control to select the person they want. FIG. 1(b) illustrates the display screen 10 with the information for the user to select from the various Kowalski names 14. The Kamm et al. system provides some improved interaction in a multi-modal context. The multi-modal disambiguation display 14 shown in FIG. 1(b) lists the Kowalskis and asks the user to choose the one that is wanted. While there are some benefits to this interactive operation, the Kamm et al. system fills the entire display screen with the disambiguation information, thus precluding the presentation of any other information. Thus, in the Kamm et al. system, other information being presented at the time the disambiguation routine executes is covered or removed since the entire screen is used for disambiguation. These multi-modal interfaces provide some improvement in efficiently providing users with information in a small number of interactions, but they still include some deficiencies.

One of the primary deficiencies is that menus or dialogs with a user that take the user away from the primary task are distracting and tend to cause the user to lose focus. Further, besides being taken to a dialog outside the primary task, the typical menu or form filling query presents the user with too much information. Thus, by the time the user can regain focus on the task, time and energy are wasted and the user has to regain momentum and attention to his or her main objective.

The benefits of multi-modal interfaces include increasing the speed and reducing the number of inputs necessary to obtain desired information. While speech recognition systems, graphical user interfaces and menu options provide some advantages, they still fail to intelligently enable a user to provide and receive information to and from a computer device with the least number of steps.

SUMMARY OF THE INVENTION

What is needed in the art is a system and method that provides a modified graphical user interface to present the user with dynamically presented options in a multi-modal context. Such a graphical user interface, in conjunction with the other means of providing and receiving information to and from a computer device, can reduce the "value chain" or required steps for providing desired information to the user.

An objective of the present invention is to provide context-sensitive interface widgets in a multi-modal dialog system such that the multi-modal exchange of information is more focused, relevant, and quick for the user.

Another object of this invention provides dynamic use of the graphical user interface by presenting widgets only when necessary and the user is currently presented with choices. In this manner, the display screen remains less cluttered with unnecessary information. Thus in addition to reducing the number of steps needed to obtain information, this approach of the present invention minimizes the extent to which the user is distracted from his or her primary task. If a map on the display is central to the primary task of the user, the context-sensitive widget maintains the map as central to the widget-related information and keeps the user looking at the map instead of requiring them to go off into another form-filling screen in order to specify a query.

The present invention comprises a system and a method of providing context-sensitive widgets in a multi-modal interface. An embodiment of the invention relates to a multi-modal dialog system comprising a multi-modal interface module that receives user multi-modal input and provides multi-modal information to the user and a widget control module that presents temporary widgets on a display screen according to a user input requirement within a multi-modal dialog between the user and the multi-modal dialog system. The widget control module can control the presentation, duration, and features associated with the widgets. For example, the control module may determine whether a widget is needed when the system requires user input, dynamically determine the best location on the display screen for the widget, and then select a widget from a plurality of widgets having different features. The plurality of widgets may comprise, for example, button widgets, slider widgets, confirmation widgets, near-to widgets, zoom widgets, and more.

The widget control module preferably only presents the widgets to the user for the duration of time in which user input is required during a multi-modal exchange of information. In this manner, the user does not have to navigate a traditional menu structure and the display is not cluttered with unnecessary images. The efficiency and speed of exchanging information between the user and the multi-modal dialog system increases since the system presents widgets only as needed and removes them when the system receives the user input or when the user changes the context of the dialog such that the widget is no longer relevant.

BRIEF DESCRIPTION OF THE DRAWINGS

The foregoing advantages of the present invention will be apparent from the following detailed description of several embodiments of the invention with reference to the corresponding accompanying drawings, in which.

DETAILED DESCRIPTION OF THE INVENTION

Figure 1A:
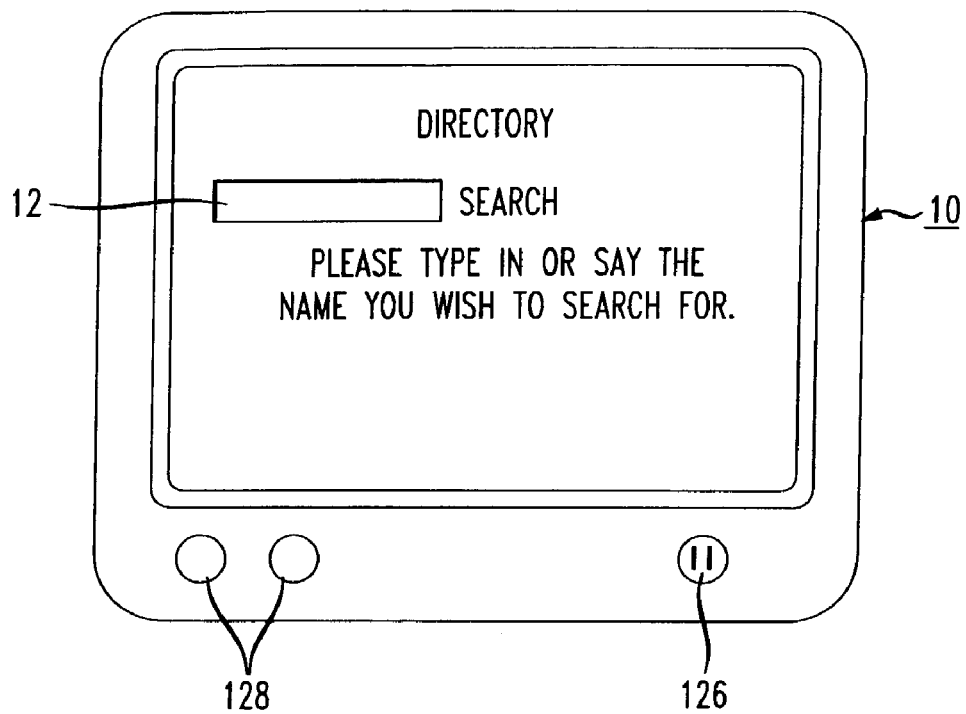
FIG. 1(a) illustrates an initial screen for a prior art Kiosk system in which the system provides the user with a menu during a speech dialog.
Figure 1B:
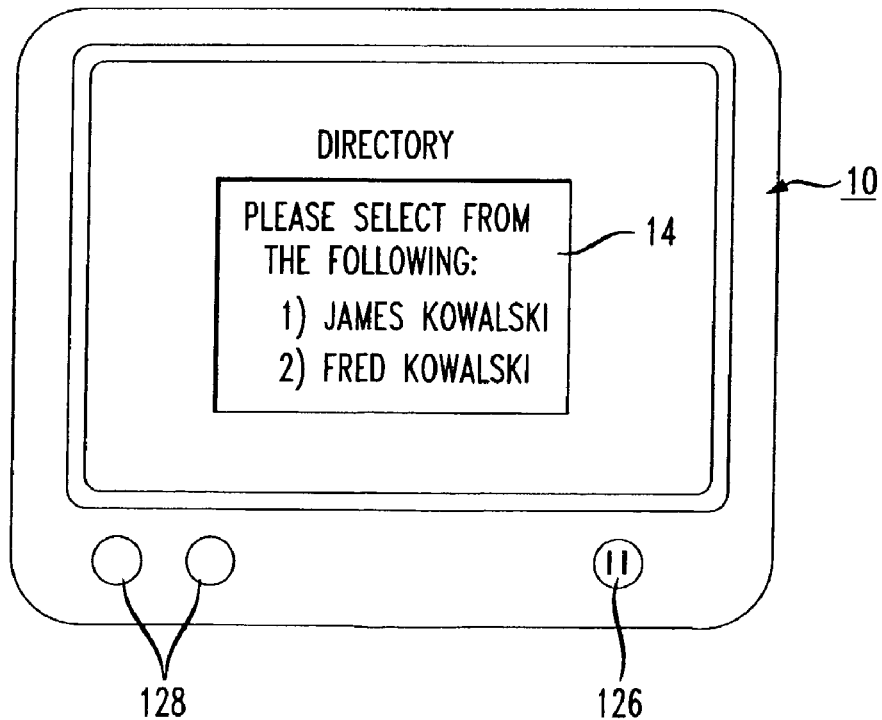
FIG. 1(b) illustrates a display screen for disambiguating user input.
Figure 2:
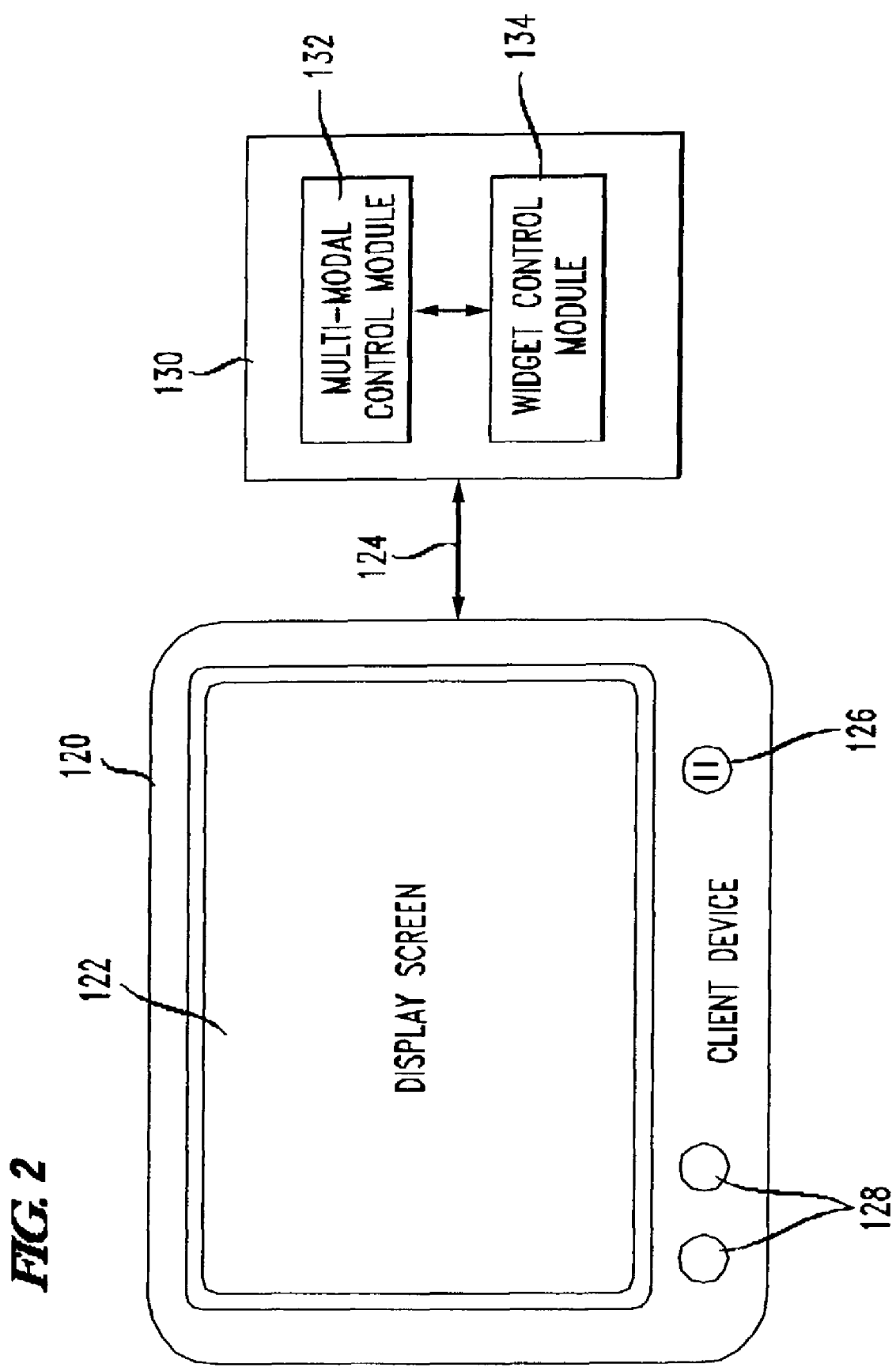
FIG. 2 illustrates an exemplary system according to an embodiment of the invention.

The present invention may be understood according to the description herein and the attached figures. FIG. 2 illustrates an example system according to the first embodiment of the present invention. In some scenarios, the present invention will operate in a client-server mode wherein a client device 120 may communicate via a wired or wireless link 124 with a server 130. The particular client device 120 is irrelevant to the present invention except that the client device must include a display screen 122 that is preferably a touch-sensitive screen as is used in Palm Pilot® devices and Fujitsu® Tablet such as the Stylistic® 500LT or 600. In the client-server mode, the computer processing and data storage for various processes according to the multi-modal interaction and presentation of widgets can be shared between the client device and the server. A "widget" preferably refers to a graphical user interface control such as a button, menu, slider, radio buttons and the like. Some widgets may also be audible and present similar information audibly to a user. Widgets may also be a combination of audio and a graphical or textual visual presentation such that the user can understand the available responses to the system.

For example, in the context of the Multi-Modal Access to City Help ("MATCH") application, a portable client device would interact with servers in different cities, each with the city help information for the respective city. The client device then can utilize the map and widget information according to the current location of the device and the desired city information without storing all of such information on the client.

Further, the present invention operates in a multi-modal context wherein a user can communicate with the client device in more than one manner, such as via speech through a microphone input 126, a stylus on the touch-sensitive display screen 122, selectable keys 128, a mouse (not shown) or other input means. Accordingly, the client device 120 must include the capability of interacting with the user in more than one manner. In the client-server context, the client device 120 may, for example, access the server 130 over any network 124, such as, for example, the Internet, a wireless-protocol network such as CDMA, EDGE or Bluetooth, a packet network, or an Internet Protocol Network. Any existing or future-developed network will do.

While FIG. 2 illustrates the system in a client/server context, in other aspects of the invention, the system may be entirely contained on a single computer device, whether portable or not. Within the process of handling multi-modal communication between a user and client device 120 and server 130, the particular location of computer processing—whether on the client device 120 or the server 130—is not relevant to the invention. In some contexts, the use of widgets may be on a small portable device that requires communication with a server over a network to operate. In other scenarios, the client device may have enough processing power and memory to store all the necessary data and modules to operate according to the present invention. As would be known in the art, such technologies as GPS or other user location identification means may be integrated into this invention for further identifying a current location of the user.

The server 130 may include several modules for controlling the interaction between the client device 120 and the user. For example, the system 130 may include a multi-modal module 132 that includes the necessary software and/or hardware to receive and process more than one kind of user interaction with the system. See U.S. patent application Ser. No. 10/216,390, filed Aug. 12, 2002, now U.S. Pat. No. 7,505,908, issued Mar. 17, 2009, U.S. patent application Ser. No. 10/278,921, filed Oct. 24, 2002, now U.S. Pat. No. 7,257,575, issued Aug. 14, 2007, U.S. patent application Ser. No. 10/216,448, filed Aug. 12, 2002, now abandoned, and U.S. patent application Ser. No. 10/216,392, filed Aug. 12, 2002, now abandoned, incorporated above, for further information regarding the kinds of hardware that may be necessary. For example, speech recognition software, gesture recognition software, and text input processing software communicate to understand and coordinate the various inputs. As is known in the art, for example, to accomplish a spoken dialog between a person and a computer device, the following are typically required: an automatic speech recognition module (ASR), a spoken language understanding module (SLU), a dialog manager (DM), and a text-to-speech module (TTS). These speech technologies are integrated with gesture and handwriting recognition modules to integrate and understand multi-modal user input. Gesture-related technologies include a user interface, handwriting recognition, gesture recognition, multi-modal parsing and understanding, a text planner and a multi-modal generator.

The GUI receives speech and ink input from the user and processes the input using speech recognition and handwriting/gesture recognition, respectively. In one aspect of the invention, the natural language understanding and multi-modal integration are performed by a single integrated component that uses multi-modal finite state transducers. This generates an N-best list of possible interpretations for the user input that is then passed to the DM. The DM re-ranks these based on the dialog context and makes a selection. It then uses the text planner and multi-modal generator to work out what to present to the user. The UI presents the graphical part, and from the TTS the speech portion is "spoken." The applications incorporated above provide background information for these various technologies. For further background, see Johnston et al., "An Architecture for Multi-Modal Dialog Systems", *ACL*, 2000, incorporated herein by reference.

Returning to FIG. 2, a widget control module 134 communicates with the multi-modal control module 132 to handle the presentation and control of the widgets. These modules 132 or 134 may be created as software written in any workable programming language such as C, C++, Java, and Visual Basic, for example. Widgets may be individual sections of computer code or may be combined with parts of the UI code or code associated with the multi-modal recognition, response generation and response delivery modules. The generation of a widget may differ depending on whether they are created purely by the UI (such as a near-to widget) or other factors. One aspect of a widget according to the present invention is a temporary graphical presentation on the display screen 122. As mentioned above, widgets may also be audible or a combination of audio and graphics. The system 130 controls the interaction and exchange of information between the client device 120 and the user.

The second embodiment of the invention relates to a method of presenting widgets to a user in a multi-modal context. The invention provides an improvement in the efficiency of human-computer interaction. As an example of multi-modal interaction, assume that the client device 120 in FIG. 2 can receive speech input via the microphone 126, gesture input via the touch-sensitive screen 122, and text or other input from buttons 128.

An advantage of advanced multi-modal systems is their ability to receive input in any mode. For example, if a user desires directions from Central Park, where the user currently is, to The Metropolitan Museum in New York, the user can simple say, "please give me directions to the Metropolitan Museum" or on a touch-sensitive screen the user can gesture to mark the Metropolitan Museum and gesture "directions." If the system does not yet know where the user currently is, the system may ask "where are you now?" and the user can say "here" and tap the screen to indicate his or her current location or say "Central Park." At this point, the system presents directions from the user's current position to the desired destination. If a GPS or other location identification system is used, the multi-modal dialog is easily adapted to request "Do you want directions from your current location?" This simplifies the required user input to a "Yes" or "No" rather than requiring the user to identify his position. A multi-modal system will coordinate and understand various combinations of input as well.

Figure 3:
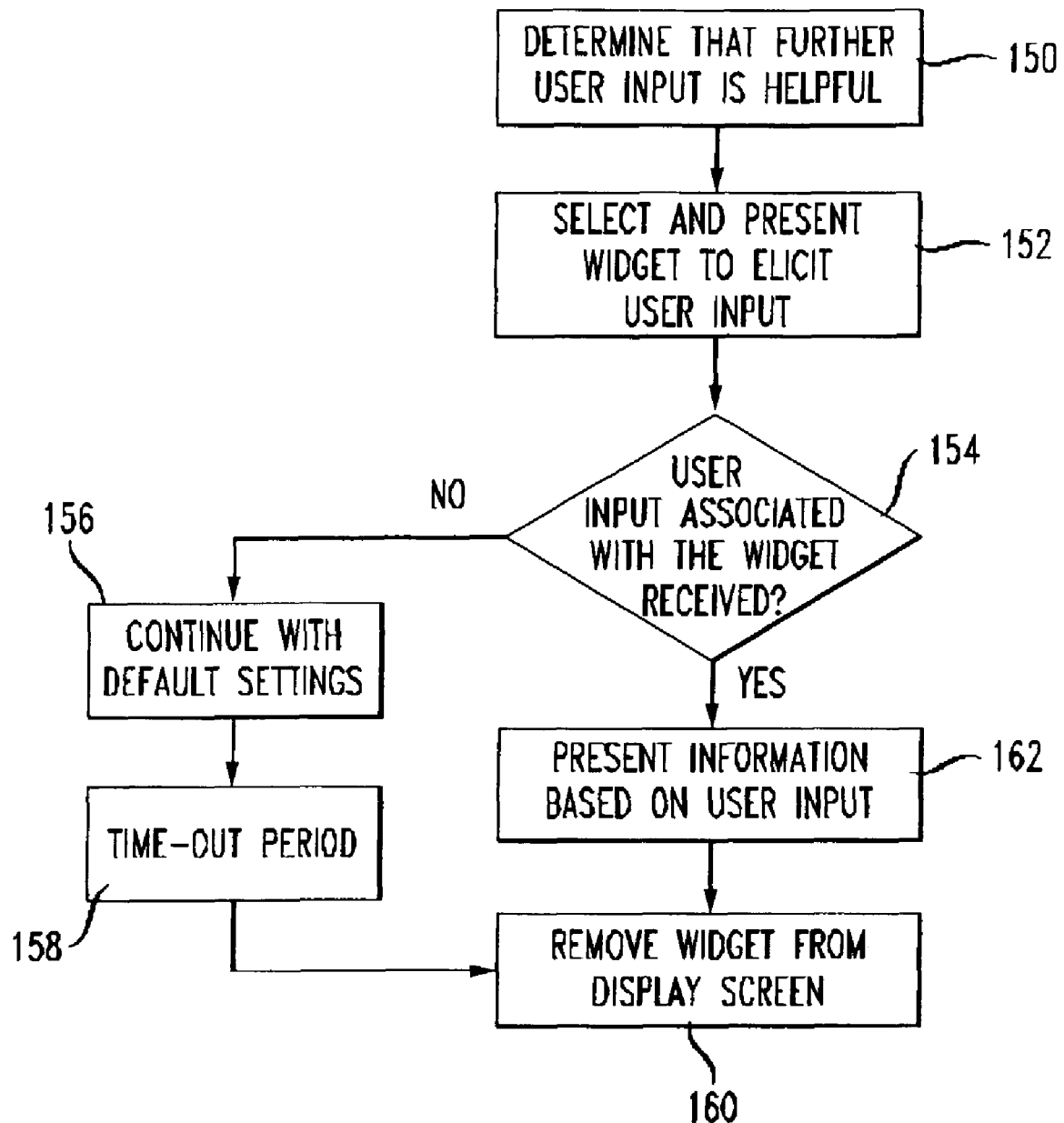
FIG. 3 illustrates a method according to an embodiment of the invention.

The present invention relates to improving the interaction at various points during the multi-modal dialog. FIG. 3 provides an example flowchart of the steps of this embodiment of the invention. The context of the invention is that during the multi-modal dialog, the system requires user input at various times. For example, the user may want to go to a museum from his current position at Central Park. The user may say "give me directions to the museum near Central Park." However, there may be more than one museum near Central Park, and the term "near" is a relative term that could mean one block or two miles. Therefore, before the system can properly respond to the user's request, more information from the user is desirable (150). Assume that Museum A and Museum B are both within a few blocks of Central Park. At this point in the dialog, the system determines that more information may be necessary or helpful to continue with the dialog and provide the user with the requested information (150). The most efficient means of interacting with the user is to present a widget that lists "Museum A" and "Museum B" (152). Instructions may also be provided like "Select from the following museums." The control software may select from a plurality of widgets the appropriate widget that elicits the correct information. For example, the plurality of widgets may comprise "triage" widgets that provide a series of buttons to enable the user to make a choice. The user can provide input via pen or speech input to indicate their choice with or without the widget, but such a widget will focus the user to elicit and prompt the user to provide the helpful information.

A triage widget results from the interplay between the DM and the UI. The DM makes a request by sending a message to the UI. The DM indicates the names of the set of choices "Restaurant Info," "Subway", etc. and for each one provides a message that it would like to have sent back if the user selects the respective option. This approach generalizes the interaction since the UI does not have to know anything about the options. In another aspect of the invention, the DM or the multi-modal generator will make most of the decisions regarding what kinds of widgets to present.

A confirmation widget is another possible widget in the plurality of widgets. A confirmation widget provides increased ability to interact when input is ambiguous. Automatic speech recognition systems, especially in mobile settings, may make recognition mistakes. Confirmation widgets provide a way for the dialog system to present a confirmation widget if the best scoring input is below a certain threshold. If the recognition score is below the threshold, the system presents a confirmation widget asking the user to confirm or clarify the recognized input. Confirmation is also desirable in situations where the action to be taken is complex, time-consuming or not easily reversed. In these situations, the system can present a confirmation widget consisting of a yes button and a no button, for example. The 100% accuracy that becomes available through the widget interaction with the user also increases the user's confidence and comfort with interacting with the system, especially in the context of being confused or needing help with regard to how to interact multi-modally. Thus, the presentation of a widget and successful reception of input from the user that is accurate improves the entire multi-modal experience for the user.

Another possible widget type is the vague parameter widget. The system utilizes this widget when the user input is vague with respect to some parameter. For example, if the user asks to see "restaurants near the Metropolitan Museum of Art" the command is vague with respect to how near the restaurants have to be. In this situation, the system can present restaurants within a default range and present the user with a slider widget (e.g., a default adjustment widget) to enable the user to fine-tune the distance range of interest. Similar sliders are used for both pan and zoom commands as will be illustrated below. The pan command can also trigger another direction widget that allows the user to quickly pan further in whichever direction they would like without having to give more spoken or written commands.

Once the system determines that it should present a widget to the user, the system selects the appropriate widget. The user then sees a widget pop-up on the display screen waiting for user input. The control software is programmed to receive a user response to the widget in a multi-modal fashion. For example, the user, upon seeing the widget, may say "I want to go to Museum A." The user may use a stylus, mouse or touch-sensitive screen to click on "Museum A" in the widget. In this manner, the system can receive the helpful or necessary user input and provide the information the user wants.

FIG. 3 continues with the system determining whether the user has provided first user input (154). If yes, as in the example above where the user says "I want to go to Museum A," the method comprises presenting information to the user based on the user input (162). At some point after receiving the user input, the method comprises removing the widget from the display screen (160). In this manner, the widget does not clutter the display screen and is only displayed as long as is necessary.

In another branch of the flow diagram of FIG. 3, the user may not respond to the widget in the multi-modal dialog. Therefore, the answer to step 154 is "no." The method comprises continuing with the multi-modal interaction using default settings (156) although there is ambiguity in the interaction. The method comprises continuing to display the widget for as long as the information can be used or for a time-out period (158) and then removing the widget from the display screen (160).

According to the steps set forth above, the system presents the user with widgets according to the current need for information. The widgets may be individually stored or dynamically created according to multi-modal interactive context. For example, if the user states as the first user input "I want to go to the museum, park and waterfront," further user input would be helpful in providing the user with the required information. For example, the system may not know where the user desires to go first. Therefore, the system may dynamically generate a widget that elicits further user input regarding which place he would like to go first with buttons for selecting the first place: "Where would you like to go first? <museum> <park> <waterfront>" (It is assumed in this example that it is clear which museum, park and waterfront the user desires to go to.) The system does this while maintaining the current dialog context rather than taking the user to a separate menu system or separate dialog that distracts and draws attention away from the current state.

The system can also dynamically select the location of the widget. Preferably, the system presents the widget in a corner or at a location on the display screen that does not interfere with other information relevant to the current multi-modal dialog interaction. If important information is presented in a corner of the display, the system can then move the position of the widget to a different location.

In addition to locating the widget in a position that does not interfere with the other information on the display screen important to the multi-modal dialog, the widget may also be presented in other ways to reduce its visibility. For example, the widget may be transparent or semi-transparent wherein information underneath the widget may be viewed. A balance can be struck between how visible and noticeable the widget will be and how transparent or almost invisible it may be. Such sliding scale changes may be default values or user-selected such that the use of and experience with widgets will be user-controlled.

Figure 4:
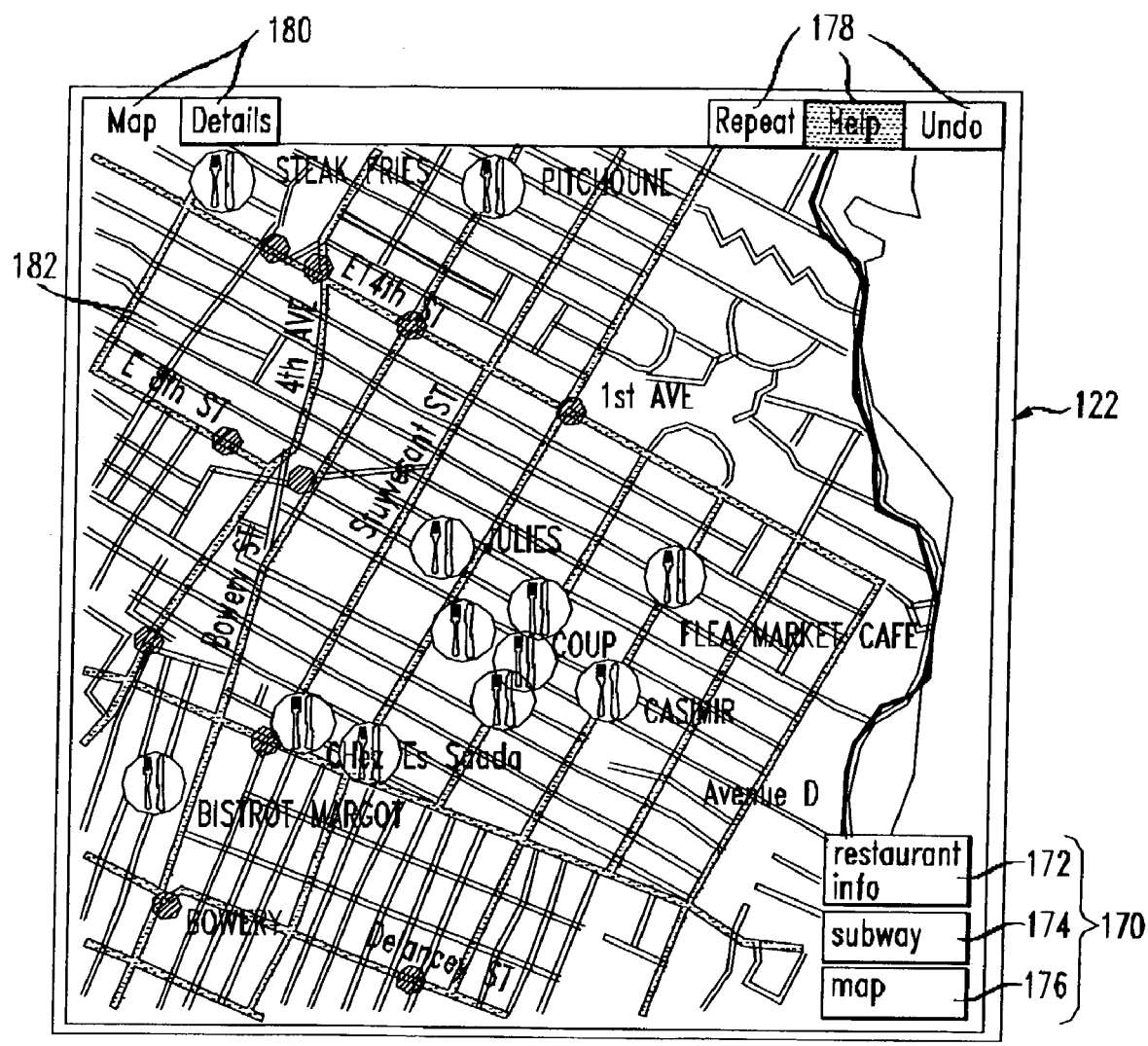
FIG. 4 illustrates a user-choice widget.

FIG. 4 illustrates a triage widget 170 positioned in the corner of the display screen 122 for a Multi-Modal Access to City Help (MATCH) application. The MATCH program is one example of a program wherein the present invention may apply. The MATCH application includes buttons 178 for user help, buttons 180 that provide a map and map details. The image 182 on the display screen in MATCH can include a map of an area including street names, information such as restaurants and subway stops, and more. The MATCH application enables a user to interact with the computer device via a stylus to circle areas on the touch-sensitive display 122, speaking, or handwriting on the touch-sensitive screen 122.

The moment during a multi-modal dialog illustrated in FIG. 4 is the presentation of a so-called triage widget 170. This kind of widget enables the user to select from a number of options. In this case, the user may have asked for help in a general way. The ambiguity in the user request requires more input for the computer device to understand and provide the appropriate response. The computer device can provide a synthetic voice to say "which kind of help would you like, restaurant, subway, or map help?" Since the context of the dialog at that moment could use a widget to elicit the response, the system presents widget 170 with buttons "restaurant info" 172, "subway" 174 and "map" 176.

Since the computer device is multi-modal, the user may ignore the widget 170 and provide a speaking response by saying: "restaurant info" or "subway" or map. The user could also write "restaurant info" on the display screen. In that case, once the computer device receives the information, it removes the widget 170 from the display screen, as controlled by the software modules governing multi-modal interaction and widget control. However, with the widget on the screen, the user can use a stylus or touch the screen to select from the widget options 172, 174, or 176. In this regard, the user can make one unambiguous tap to select the desired option. Again, after the computer device receives the user input, the multi-modal dialog no longer expects or needs user input associated with the presentation of the widget; therefore the device removes the widget from the display screen.

The user may ignore the widget and not respond to the request but may request information different from the original request. In these scenarios, the present invention provides that whenever the context changes in the multi-modal dialog wherein the widget options are no longer relevant, the device removes the widget to reduce the clutter on the display screen 122.

Although the position of the widget 170 is in the lower right-hand corner of the display screen, the control modules within the computer device or server can position the widget dynamically to eliminate the possibility that the device will place the widget over an important portion of the GUI.

Figure 5:
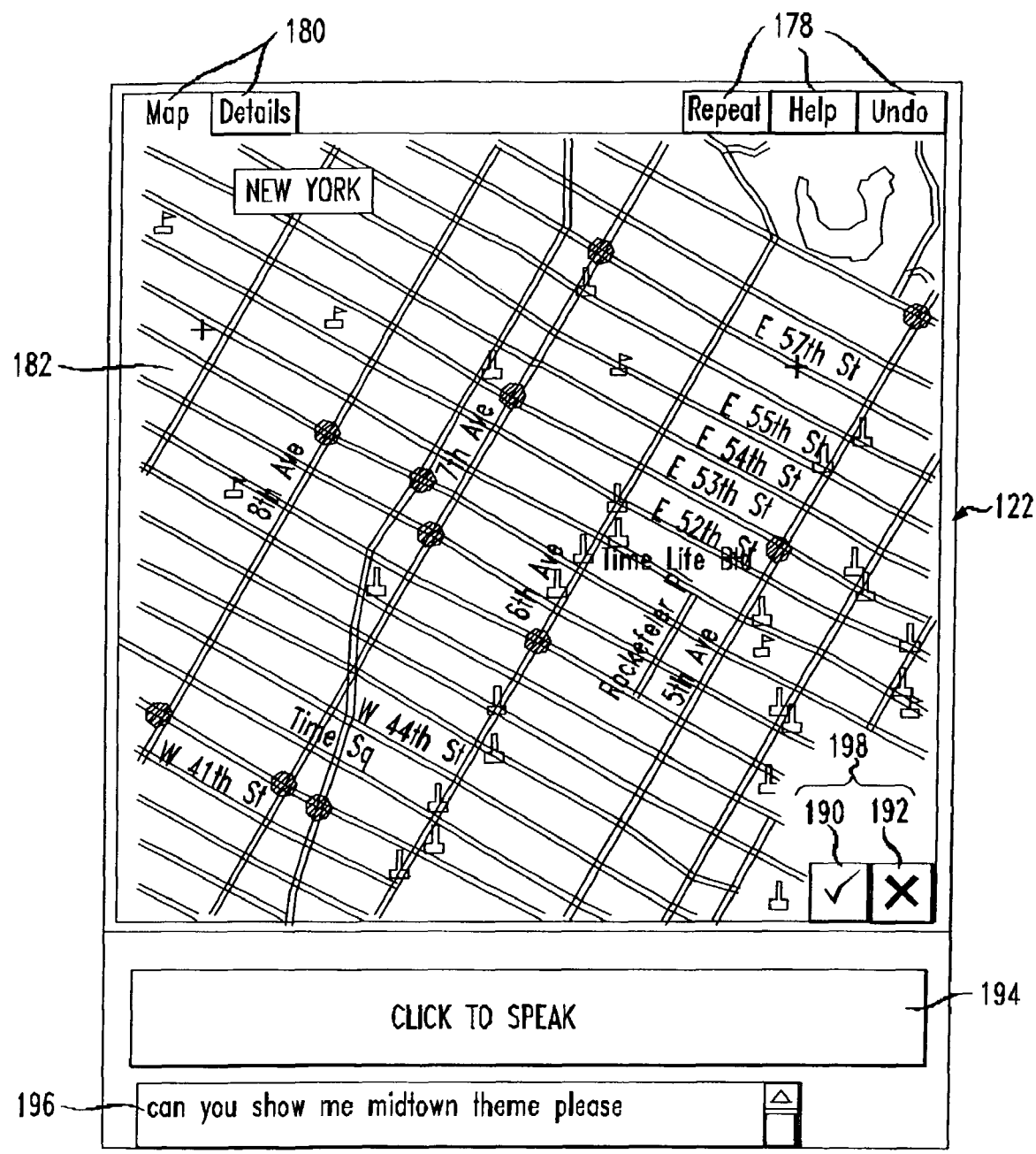
FIG. 5 illustrates a confirmation widget.

FIG. 5 illustrates a confirmation widget 198. When the system receives speech input with a low automatic speech recognition (ASR) score, the dialog manager (not shown) engages the user in a confirmation dialog. The confirmation widget may also be presented in other contexts such as if the action to be performed is expensive, highly computational, will take a long time, or is non-benign. Other reasons may also be relevant for when the system should present a confirmation widget. The confirmation-type widget 172 may comprise buttons such as a check 190 and an "x" 192 or a "yes" and a "no." FIG. 5 further illustrates a click-to-speak option 194 that the user can click to start speaking. A text field 196 provides the output from the ASR module so that the user can view the interpretation of the ASR. The text field 196 can also be used when the system provides a response or information to the user. In this case, just text, or a combination of speech and text may be provided to provide information to the user.

The system provides the confirmation widget 198 when a user confirmation is needed. For example, if the user states: "Show me the Chinese restaurants in Chelsea," the background environment where the user made the statement may be that of a busy street. The ASR score may be low because of a number of reasons. If the system desires confirmation, the system can present the confirmation widget 198 in conjunction with a synthetic speech such as "Did you say Chinese restaurants in Chelsea?" Through the multi-modal interaction of the system, the user can say "yes" or "no" in response to the widget but can also click on the "yes" button 190 or "no" button 192. Therefore, if the environment continues to be difficult, the widgets further enhance and enable the multi-modal communication. The principle of the confirmation widget 198 can be applied to any interaction where a "yes" or "no" or other confirmation is needed by the system.

Figure 6:
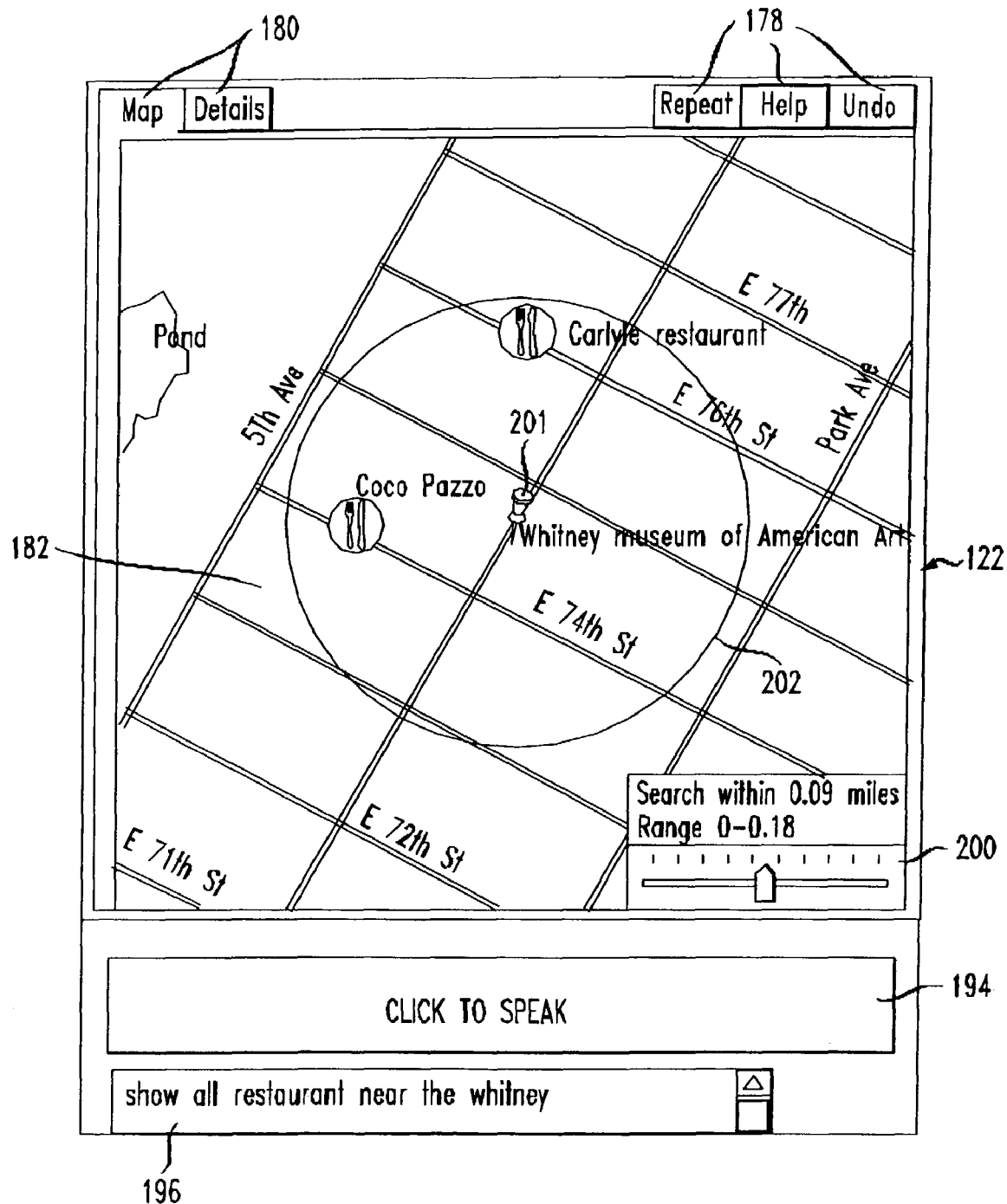
FIG. 6 illustrates a near-to widget.

FIG. 6 illustrates a near-to widget 200. The system presents this type of widget during the course of a multi-modal dialog when, for example, a user asks to see restaurants near a certain location. Suppose the user says: "show restaurants near the Whitney Museum." The term "near" is relative—how near does the user mean? One mile, one block? In this case, the system can assume a default value but can also present a slider widget that helps the user to clarify the term "near." As shown in FIG. 6, the system shows the Whitney Museum 204 in the map 182 in the display 122 with a radius indicator 202. The widget 200 can include other helpful information like "search within 0.09 miles" and "range 0-0.18". This information corresponds to the shown radius indicator 202. The slider widget 200 enables the user to adjust up or down the radius 202 related to the term "near." As with the other widgets above, the user can manipulate the widget either via a stylus or touch-sensitive display 122, or via speaking such as "bigger radius" or "smaller radius" to refine the search area. Once the user refines the term "near" either using the widget or otherwise, the system removes the widget 200 to clean up the display screen 122.

With regard to the default value set for the relative term "near," another type of widget may also be provided so that the user can adjust the assumed default value. This widget may only be presented periodically or on a specific interval. For example, the default "near to" widget may be presented the first time the default value is assumed. Then, if the user never or rarely adjusts the near-to widgets presented later (after the initial default-setting near-to widget), then the system assumes that the default value is still relevant. However, if the user continues to adjust the near-to widgets as they are presented, then the system may again present a default value near-to widget to revise the default. This process may also be done automatically if the system can determine a pattern from the user. In this manner, the system can reduce the number of interactive steps that would be necessary if it insisted on entering into a dialog with the user to indicate how "near" they mean.

As can be appreciated, while the basic principle set forth above is in the context of looking for restaurants near a museum, the concept of presenting a slider widget when a relative term needs refinement can be applied in many scenarios and is certainly not limited to the example provided. Any multi-modal interaction wherein a size, distance, amount or any other parameter can be adjusted on a sliding scale can be modified or refined using a near-to widget.

The slider widget will function in any kind of application context. For example, in a real estate sales application, the user might ask to see three-bedroom homes. The system may respond with a listing or other presentation of three-bedroom homes and include a slider-type widget to enable the user to easily adjust price range, number of bedrooms, a maximum price and/or a minimum price, or any other attribute or parameter.

Figure 7:
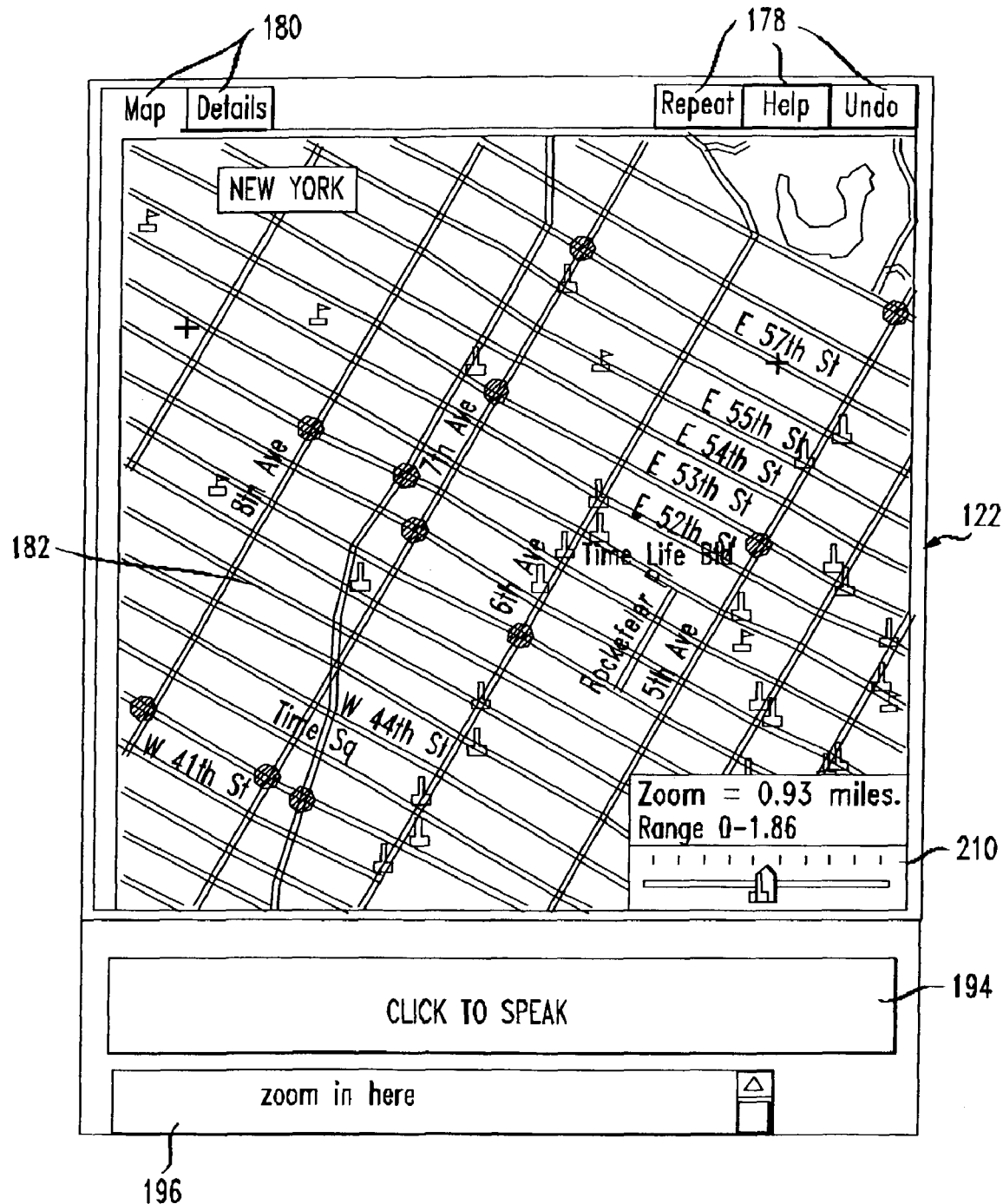
FIG. 7 illustrates a zoom widget.

FIG. 7 illustrates a zoom widget 210 that is also a slider widget. The example application of this widget is when the user states "please zoom in." When a map 182 or other schematic is shown on the display, the user may desire to zoom in, but the system will not know exactly how much to zoom in. Without an additional control, the default zoom value may be much less than the zoom amount desired by the user. In the speech-only control scenario, the user would have to say multiple times "zoom in" to achieve the desired zoom amount. Such repetition can clearly become annoying.

In the multi-modal context, the user may tap on a portion of the screen and state "zoom in here." Again, the zoom amount is not known and the default amount may force the user into multiple voice inputs. In order to simplify a zoom or zoom-like operation, the system presents a zoom widget 210 with a slider. Other information may be presented as well, such as "zoom-0.93 miles" and "Range: 0-1.86". In this manner, the user can easily interact with the device to modify the desired zoom range. The user can say "zoom in more" in which case the system zooms in an incremental amount, or the user can manipulate the slider on the widget 210 to the desired zoom amount.

After the system receives the desired zoom amount range (or when the user moves on to a different multi-modal interaction where the zoom amount is no longer needed), the system removes the zoom widget 210 from the display screen 122. As one of skill in the art will appreciate, the principle of the zoom widget 210 applies to any scenario and is certainly not limited to maps.

Figure 8:
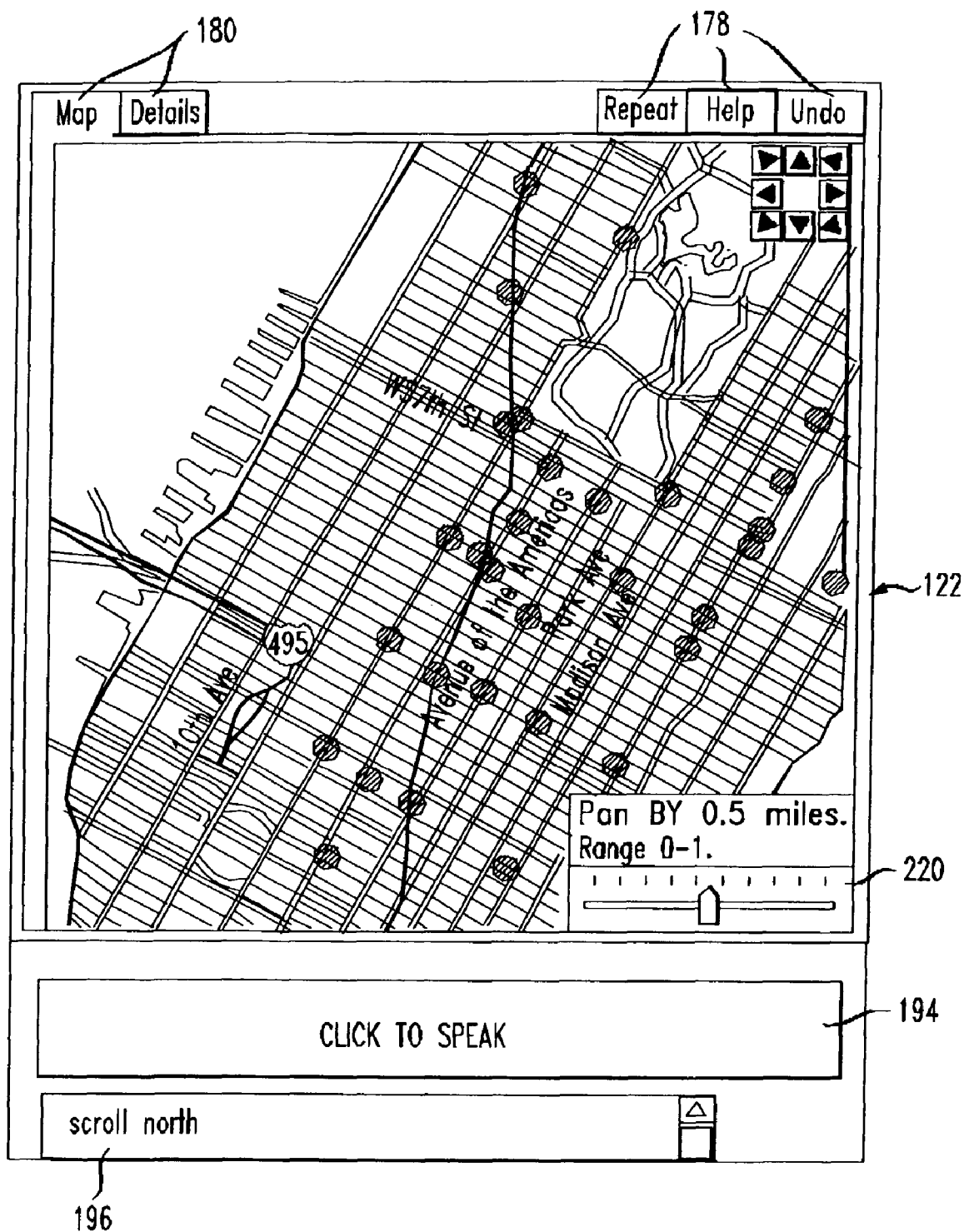
FIG. 8 illustrates a pan widget.

FIG. 8 illustrates a pan widget 22 that is another variation on the slider-type widget. The system presents a pan widget 220 when the user states something like "pan north" and the amount of panning is unclear. The system can pan a default amount and then present a pan widget 220 with a slider to adjust the extent of the panning. The advantage of this widget is that the system assumes that the user will likely desire to continue to pan in one direction or the other. For example, the user may realize that after panning east, they also need to pan a little bit south. The multi-modal pan widget enables the user to give one pan command, and then receive the appropriately designed widget to fine-tune the panning direction and/or amount.

Other information can be provided with the pan widget 220 such as "pan by 0.5 miles" and "range: 0-1." With the pan widget 220 present, the user can interact with the system multi-modally to provide input. The user can say "pan 2 miles north" or "pan 1 mile north-east." Or the user can manipulate the slider to pan the desired amount. Once the user completes the panning input, the system removes the pan widget 220 to reduce the clutter on the display screen 122.

The pan widget 220 may also include other features to further amplify its effectiveness. For example, since panning can occur in multiple directions, the pan widget 220 may include a set of eight arrow keys (not shown) in addition to the slider. In this manner, the user can manipulate the enhanced pan widget to select both a direction and a pan amount to arrive at the desired position on a map or any kind of figure where panning may be used.

Although the above description may contain specific details, they should not be construed as limiting the claims in any way. Other configurations of the described embodiments of the invention are part of the scope of this invention. For example, the principles of the present invention apply to any multi-modal input where refinement of user information can increase and enhance the exchange of information. Applications where maps, diagrams, schematics, navigational charts, etc. are used can benefit from the principles of the present invention. Accordingly, the appended claims and their legal equivalents only should define the invention, rather than any specific examples given.

We claim:

1. In a multi-modal dialog system, a method of providing widgets to a user, comprising, after first user input received in a combination of a first mode and a second mode in a map-based application, and where further user input will clarify the first user input during a multi-modal dialog:
   maintaining a current display screen context by only presenting additional data on a display in response to the first user input until further user input is received via interaction with the additional data that clarifies the further user input;
   maintaining a current dialog context;
   presenting speech to the user requesting the further user input to clarify the first user input; and
   presenting the slider widget in a corner of the display screen to elicit the first user input as directed by the presented speech, wherein the further user input is received via the widget in a non-speech mode and provides distance range data that is shown on the display screen as the slider widget is adjusted by the further user input.

2. The method of claim 1, wherein the user may manipulate the widget using a stylus, mouse, or touch.

3. The method of claim 1, wherein the widget appears at a location on the display screen that does not interfere with the multi-modal dialog.

4. The method of claim 3, wherein the multi-modal dialog system dynamically selects the location of the widget according to a multi-modal dialog context such that the widget does not cover relevant information on the display screen.

5. The method of claim 1, wherein the widget comprises a list of selectable buttons.

6. The method of claim 1, wherein the widget comprises arrow buttons.

7. A method of temporarily providing one of a plurality of widgets to a user in the course of a multi-modal dialog with a computer device in a map-based application, the method comprising:
   after first user input received in a combination of a first mode and a second mode, determining whether further user input would be advantageous before the computer device presents information to the user;
   if further user input would be advantageous, selecting a widget from a plurality of widgets to yield a selected widget, the selected widget being associated with the further user input;
   maintaining a current display screen context by only presenting additional data on a display in response to the first user input until further user input is received via user interaction with the additional data that clarifies the further user input;
   maintaining a current dialog context;
   presenting speech to the user requesting the further user input to clarify the first user input; and
   presenting the selected widget in a corner of the display for receiving the further user input as directed by the presented speech, wherein the further user input is received in a non-speech mode and provides distance range data that is shown on the display screen as the selected widget is adjusted by the further user input.

8. The method of claim 7, wherein the plurality of widgets comprises at least button widgets.

9. The method of claim 7, wherein the computer device dynamically generates the content of the selected widget according to the required further user input.

10. The method of claim 7, further comprising, when the user provides the further input, removing the selected widget from the display.

11. A multi-modal dialog system presenting a map-based application comprising:
    a multi-modal interface module that receives multi-modal input from a user received in a combination of a first mode and a second mode and provides multi-modal information to the user;
    a module that maintains a current dialog screen context by only presenting additional data on a display in response to the multimodal input until further user input is received via user interaction with the additional data that clarifies the multimodal input; and
    a widget control module that dynamically presents the slider widget on the display screen to facilitate a multi-modal dialog between the user and the multi-modal dialog system, the slider widget receiving further user input in a third mode, the further user input clarifying the first user input and providing distance range data that is shown on the display screen as the slider widget is adjusted by the further user input.

12. The multi-modal dialog system of claim 11, wherein the widget control module selects the slider widget from a plurality of widgets.

13. The multi-modal dialog system of claim 12, wherein the plurality of widgets comprises at least a button widget.

14. The multi-modal dialog system of claim 11, wherein the widget control module only presents slider widgets in the course of the multi-modal dialog when the multi-modal dialog system receives first user input and further user input could refine the first user input.

15. The multi-modal dialog system of claim 11, wherein the user can provide user input via the widget by stylus, mouse control, or touch.

16. The multi-modal dialog system of claim 11, wherein the user can provide user input in response to the slider widget via speech rather than interacting with the widget via a non-speech mode.

17. The multi-modal dialog system of claim 11, wherein the widget module further presents slider widgets on the display screen at a location that does not interfere with the presentation of multi-modal information.

18. The multi-modal dialog system of claim 11, wherein the slider widgets are transparent.

19. The multi-modal dialog system of claim 11, wherein the widget module dynamically selects a location of the slider widget according to content on the display screen.

20. The multi-modal dialog system of claim 11, wherein the user can control the appearance of the slider widgets during the multi-modal dialog.

* * * * *